(12) United States Patent
Sawa

(10) Patent No.: US 7,097,442 B2
(45) Date of Patent: Aug. 29, 2006

(54) EXTRUDER

(76) Inventor: Kohei Sawa, 2-5-17, Higashinakahama, Joto-ku, Osaka-shi, Osaka 536-0023 (JP)

( * ) Notice: Subject to any disclaimer, the term of this patent is extended or adjusted under 35 U.S.C. 154(b) by 0 days.

(21) Appl. No.: 10/496,976

(22) PCT Filed: Nov. 29, 2002

(86) PCT No.: PCT/JP02/12491

§ 371 (c)(1),
(2), (4) Date: Jul. 21, 2004

(87) PCT Pub. No.: WO03/045664

PCT Pub. Date: Jun. 5, 2003

(65) Prior Publication Data

US 2005/0048156 A1   Mar. 3, 2005

(30) Foreign Application Priority Data

Nov. 30, 2001   (JP) .............................. 2001-366879

(51) Int. Cl.
*B28B 17/02*  (2006.01)
(52) U.S. Cl. ...................... 425/204; 425/208; 425/200; 425/209; 366/85; 366/88
(58) Field of Classification Search ................. 425/204, 425/208, 200, 209; 366/80–90
See application file for complete search history.

(56) References Cited

U.S. PATENT DOCUMENTS 5,048,971 A * 9/1991 Wall et al. .................... 366/85
5,186,539 A * 2/1993 Manser et al. ................ 366/85
5,573,332 A * 11/1996 Weihrich et al. .............. 366/85
5,716,159 A    2/1998 Tomikawa

FOREIGN PATENT DOCUMENTS

| JP | 61-035775 | 2/1986 |
| JP | 62-286708 | 12/1987 |
| JP | 62286708 A * | 12/1987 |
| JP | 5-50424 | 3/1993 |
| JP | 6-031725 | 2/1994 |
| JP | 06031725 A * | 2/1994 |
| WO | 98/13189 | 4/1998 |

* cited by examiner

Primary Examiner—Robert Davis
Assistant Examiner—G. Nagesh Rao
(74) Attorney, Agent, or Firm—Wenderoth, Lind & Ponack, L.L.P.

(57) ABSTRACT

An extruder capable of obtaining a treatment volume equal to that of the conventional art without enlarging a screw diameter is provided. The extruder includes screw shafts, a drive unit, and a barrel, in which three or more screw shafts having the same diameter and the same root diameter in a waveform shape are engaged with each other and arranged in parallel to each other horizontally or nearly horizontally, while a distance between axial centers is made equal. According to the above configuration, the same treatment volume as that of a conventional extruder can be handled by screw shafts of smaller diameter as compared with that of the conventional art. By using the screw shafts of the smaller diameter as compared with the conventional art, temperature irregularities of an extrusion material in screw grooves, leakage of the extrusion material from the screw shafts, an installation area of the extruder, and the like conventional trouble of various kinds can be eliminated.

8 Claims, 9 Drawing Sheets

EXTRUDER

TECHNICAL FIELD

The present invention relates to an extruder for kneading and extruding a material through rotation of screws.

BACKGROUND ART

Figure 12:
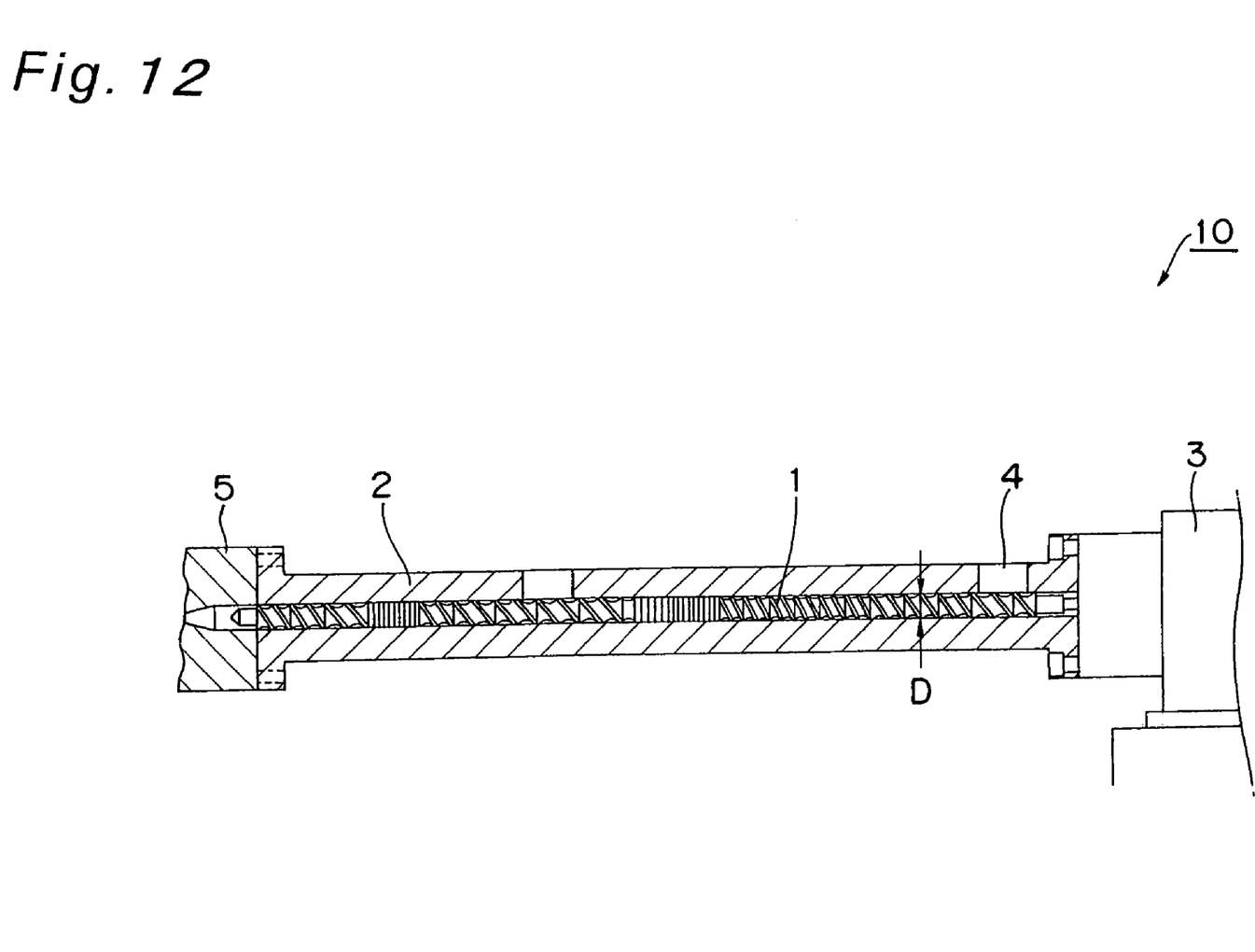
FIG. 12 is a diagram showing a constitution of a conventional extruder.
Figure 13:
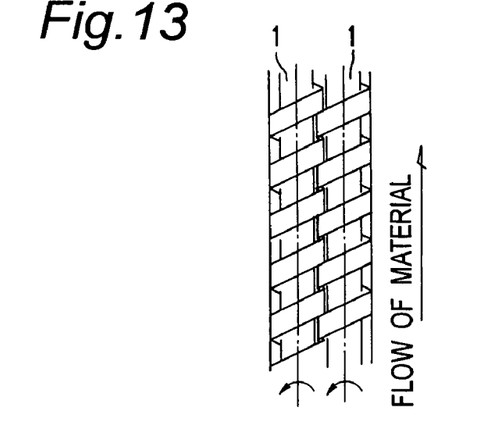
FIG. 13 is a diagram indicative of a form example of screw shafts installed in the extruder shown in FIG. 12.
Figure 14:
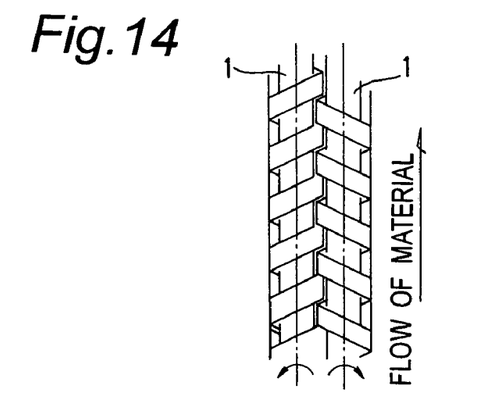
FIG. 14 is a diagram indicative of a form example of screw shafts installed in the extruder shown in FIG. 12.
Figure 15:
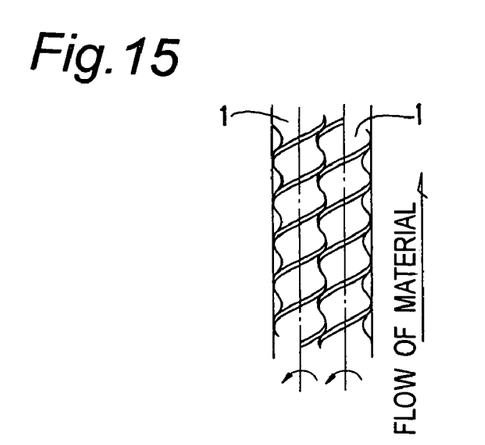
FIG. 15 is a diagram indicative of a form example of screw shafts installed in the extruder shown in FIG. 12.

As is shown in FIG. 12, there exists an extruder 10, which extrudes a material supplied from a material inlet port 4 to a die part 5 by rotating a screw 1 inserted in a barrel 2 that corresponds to a housing and has a heater, and the screw 1 is rotated by a driving part 3. The extruder 10 transfers while heating and kneading the material in the barrel 2 (for example, with reference to a cited document 1: published specification of Japanese Patent Laid-Open No. 5-50424). As the extruder 10 in this configuration, there is a type having one screw (i.e., one screw shaft) 1 and another type having two screws 1 (i.e., two screw shafts). The twin-screw type extruder with two screws 1 meshed with each other is divided into one in which each screw 1 rotates in the same direction as shown in FIGS. 13 and 15, and one in which each screw rotates in a different direction as shown in FIG. 14. Also with respect to a shape of the screw (screw shaft) 1, there are a trapezoidal screw shape as indicated in FIGS. 13 and 14, and a waveform screw shape as indicated in FIG. 15 other than the trapezoidal screw shape.

Figure 16:
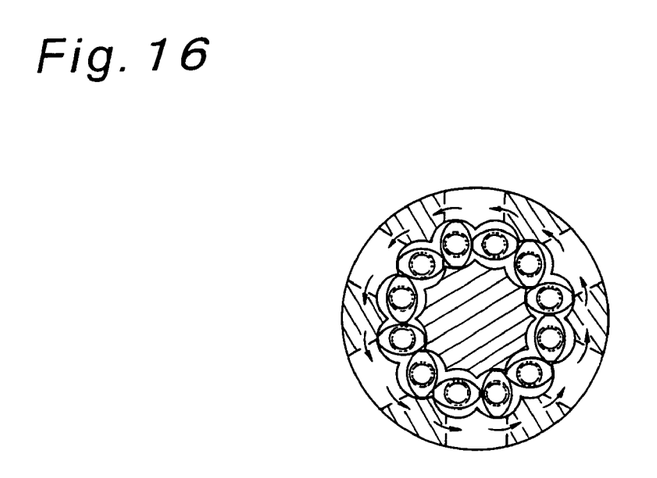
FIG. 16 is a sectional view of a conventional extruder with multiple screw shafts.

Furthermore, there are extruders having three or more screws. These extruders are constructed in such forms that many screws are arranged circumferentially as indicated in FIG. 16, with two sets each consisting of two mutually engaged screws separately arranged while the screws are not engaged with each other between the sets. Each screw in the same set rotates in the same direction while the screws are made to rotate in different directions between different sets. Conventionally, no extruder is present in which three or more of the aforementioned waveform screws are arranged horizontally and meshed with each other to rotate in the same direction.

For the twin-screw extruder with two screws engaged as described above, an increase in the quantity of the material to be extruded (that is, an increase in the treatment volume) is required. To cope with this, in FIG. 17, an outer (large) diameter D of the screw shaft 1 is increased and a root (small) diameter 17 of the screw 1 is decreased. In other words, a depth 16 of the thread grooves of the screw shaft 1 is made larger regardless of the rotation direction and the shape of the screw in the conventional art. Here, "to increase the screw diameter" is taken for the case that the screw diameter exceeds approximately 90 mm.

However, to increase the screw outer (large) diameter results in an elongated facility length, and also an increase in mechanical loss and an increase in driving current of the screw shaft due to a large rotation weight of the screw shaft or the like. Moreover, since the barrel shape is enlarged as well, it takes time for the heater to raise temperatures. When a large screw shaft is designed, normally, a sectional shape of the large screw is made geometrically similar to a sectional shape of a small screw, and a value of L/D which is a ratio of a screw outer circumference moving distance when the screw rotates once and a groove depth of the screw is made constant. Under this condition, a peripheral velocity of the large screw is faster as compared with the small screw, whereby a self-heating value because of kneading of the material present in thread grooves of the screw is increased and the material is degraded. Furthermore, the above speeding up of the peripheral velocity necessitates considerations with respect to abrasion of the screw and the barrel.

Figure 17:
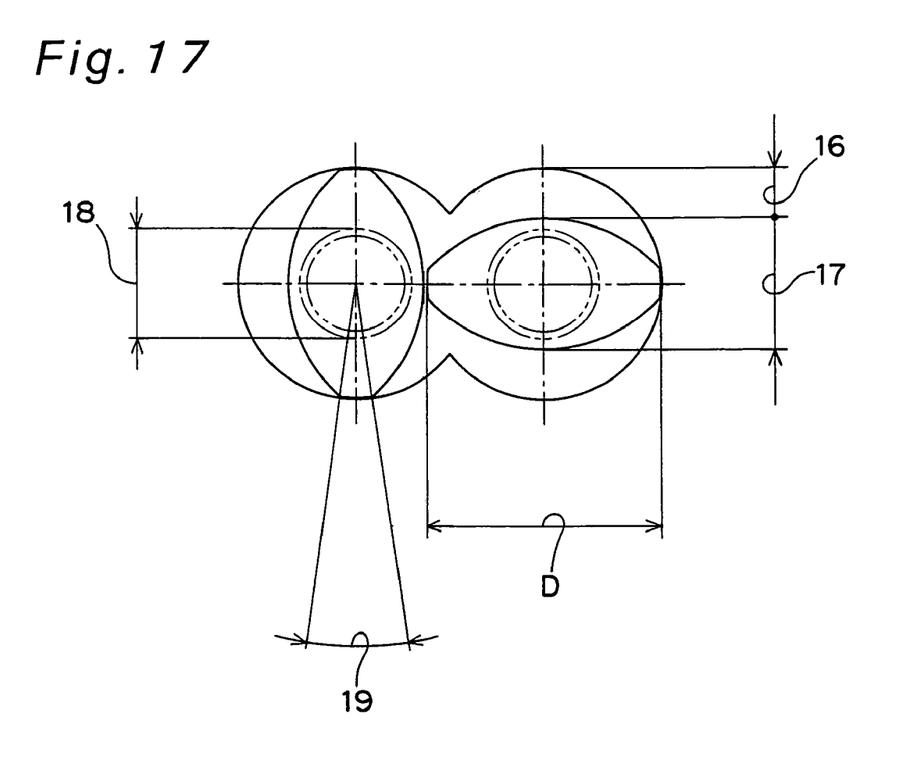
FIG. 17 is a diagram for explaining each part in a conventional twin-screw extruder.

Meanwhile, to increase the groove depth of the screw 1 makes a flight angle 19 of the screw denoted in FIG. 17 smaller. This reduction of the flight angle 19 decreases an abrasion resistance of the screw shaft 1, and at the same time increases a leak amount of the material from the screw shaft 1. Since a shaft diameter 18 of the screw shaft 1 is reduced when the groove depth 16 of the screw 1 is increased, it brings about a problem in terms of a strength of the screw 1.

Taking the above problem into consideration, to increase the screw diameter (that is, to increase the groove depth for increasing the treatment volume) is not necessarily a good solution. In general, when an extruder with a large diameter screw is to be designed, experiments are carried out with the use of an experimental extruder with a small diameter screw, and a mix proportion of materials to be treated, a screw shape and the like at the actual machine with the large diameter screw are determined on the basis of the acquired empirical data. However, it is reality that the actual machine does not always bear the same result as designed because of a difference in the screw diameters between the experimental machine and the actual machine, and the like.

The present invention is devised to solve the above-described problems, and has for its object to provide an extruder capable of obtaining a treatment volume equal to that of the conventional art without increasing a screw diameter.

SUMMARY OF THE OF INVENTION

An extruder of the first aspect of the present invention comprises:

three or more screws with the same diameter and the same root diameter in a waveform shape, which are engaged with each other and arranged in parallel to each other horizontally or nearly horizontally while a size between axial centers of the screws is made equal;

a drive unit which is configured to rotate all of the screws at the same velocity in the same direction; and a barrel with a screw fitting part in which all of the screws are inserted rotatably and which is configured to knead and move an extrusion material present in a thread groove of the screw to a thread groove of the adjacent screw through rotation of the screws by the drive unit, all of the screws inserted in the screw fitting part being disposed so as to engage tightly with each other while clearances each between the thread groove of one of the engaged screws and a crest of the other of the engaged screws are made constant and at the same time, the clearances and a clearance between the crest of the screw and an inner face of the barrel are made so narrow as to reduce leakage of the extrusion material for whole of the adjoining screws, the extrusion material being moved transferring the thread grooves of all of the screws along the inner face of the barrel by the rotation of the screws in the same direction.

The extruder may be designed so that over the diameter of the screw is 50 mm or smaller.

The extruder may be designed so that the extruder further includes a molding section attached to the barrel for molding the extrusion material extruded by the screws.

The extruder may be designed so that the screw fitting part has switching portions configured to switch a moving direction of the extrusion material so as to improve kneadability of the extrusion material when the extrusion material present in the thread groove of the screw is moved to a thread groove of the adjacent screw, the extrusion material being moved transferring all of the switching portions formed in the screw fitting part along the inner face of the barrel by the rotation of the screws in the same direction.

The extruder may be designed so that the screws are arranged with a shift of every 90 degrees between a crest of one screw and a crest of the adjacent other screw when the screws are formed by a two-thread screw.

An extruder according to the first aspect of the present invention includes screw shafts, a drive unit and a barrel. Three or more screws are installed, each formed in a waveform shape with the same diameter and the same root diameter. The screw shafts are engaged with each other while a distance between axial centers of the screw shafts is made equal, and are arranged in parallel to each other horizontally or nearly horizontally. According to the configuration, a treatment volume equal to that of the conventional extruder can be handled by screw shafts with a small outer diameter as compared with the conventional one. Using the screw shafts with the small outer diameter as compared with the conventional one can eliminate conventional various kinds of trouble such as a change of a screw peripheral velocity, temperature unevenness of a material for extrusion, leakage of the material for extrusion from screw grooves and a setting area of the extruder.

Further because of attaching the molding section, the extrusion material extruded by the screw shafts can be molded.

DETAILED DESCRIPTION OF THE INVENTION

An extruder as an embodiment of the present invention will be described below with reference to the drawings. It is to be noted that like parts are designated by like reference numerals through the drawings.

Figure 3:
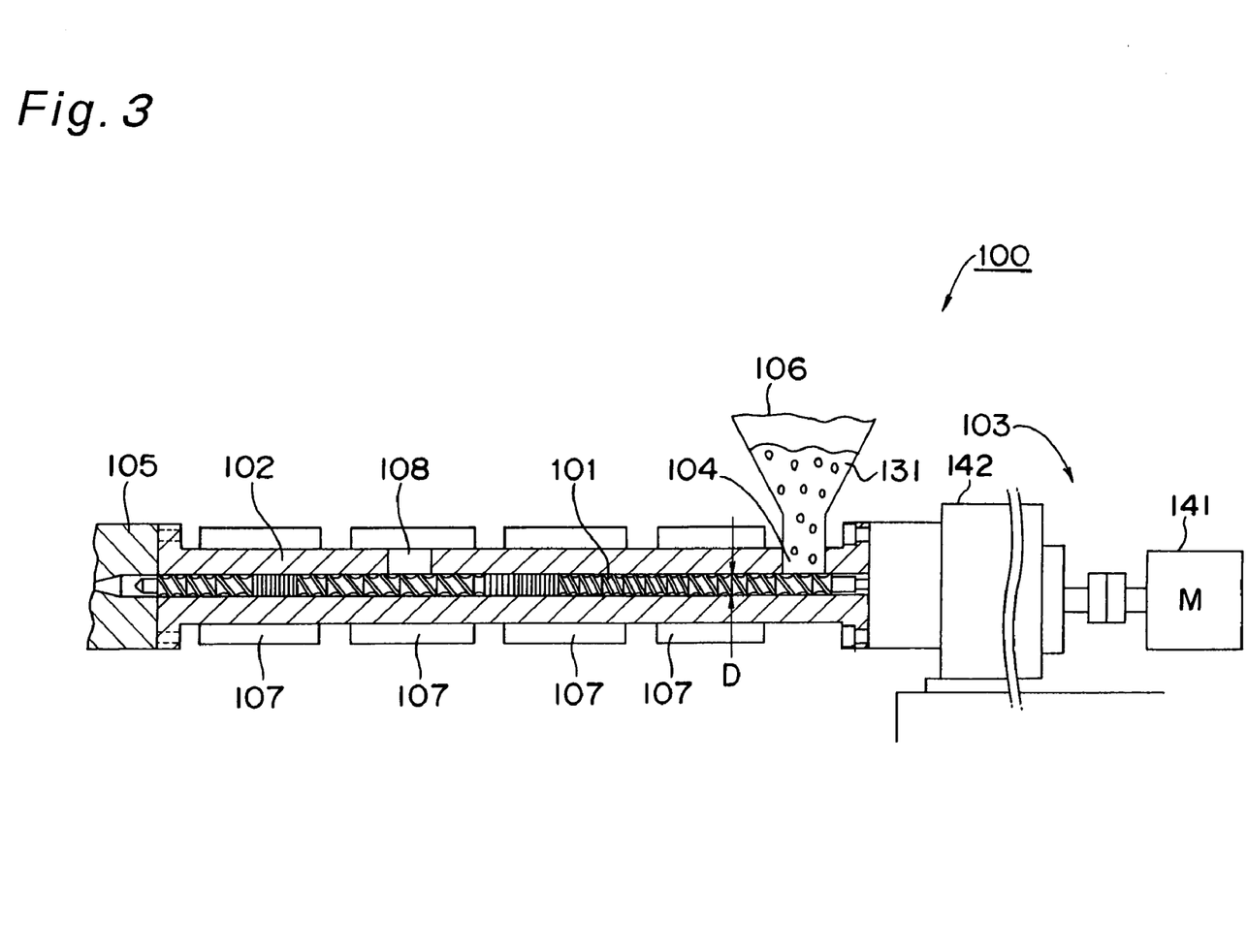
FIG. 3 is a side view of the extruder of the embodiment of the present invention.
Figure 4:
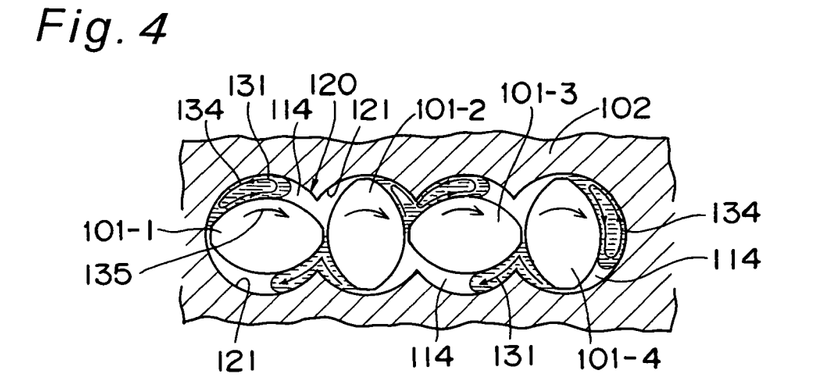
FIG. 4 is a diagram for explaining a state in which a material for extrusion is transferred by the screw shafts shown in FIG. 1.
Figure 5:
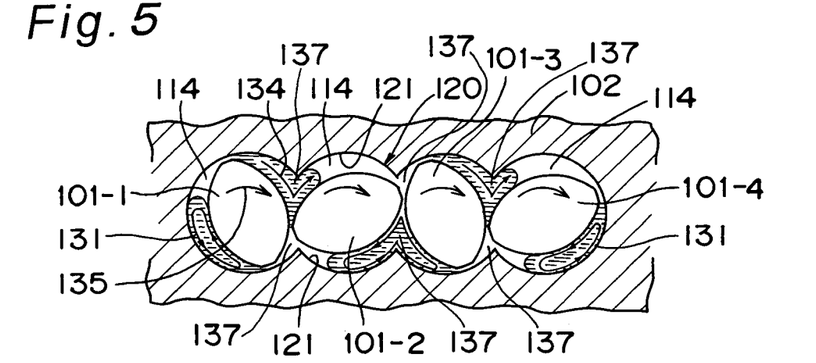
FIG. 5 is a diagram for explaining a state in which the material for extrusion is transferred by the screw shafts shown in FIG. 1.
Figure 6:
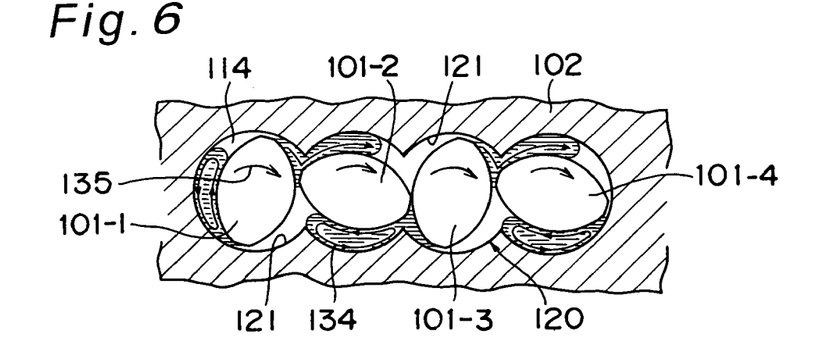
FIG. 6 is a diagram for explaining a state in which the material for extrusion is transferred by the screw shafts shown in FIG. 1.
Figure 7:
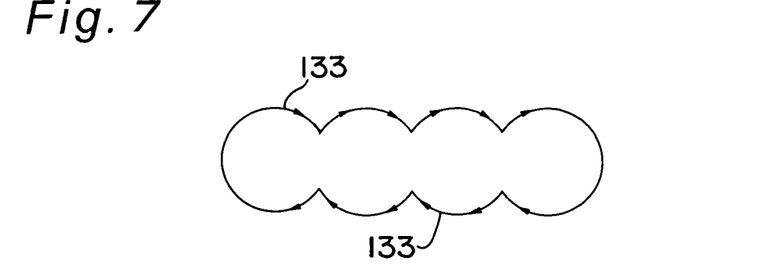
FIG. 7 is a diagram for explaining a route whereby the material for extrusion is transferred in a barrel by the screw shafts shown in FIG. 1.

As shown in FIG. 3, an extruder 100 of the embodiment includes screws (i.e., screw shafts) 101, a barrel 102, and a drive unit 103, and can further be equipped with a die 105 which corresponds to a molding section. In the present embodiment, the barrel 102 has a material supply part 104 for supplying a material 131 for extrusion, a vent part 108 as an air vent part for the material 131 transferred by the screws 101, and a heating/cooling device 107 for heating or cooling the material 131. FIG. 3 shows an embodiment in which a hopper 106 for storing the material 131 is attached to the material supply part 104. However, the extruder 100 is not limited to this form and can be of a form with another extruder connected thereto for forcibly or quantitatively supplying the material 131 to the material supply part 104. An example of the material 131 for extrusion is a mixture in a solid state of plastic and a filler. The solid state is, for instance, a state of pellets or powder.

Figure 1:
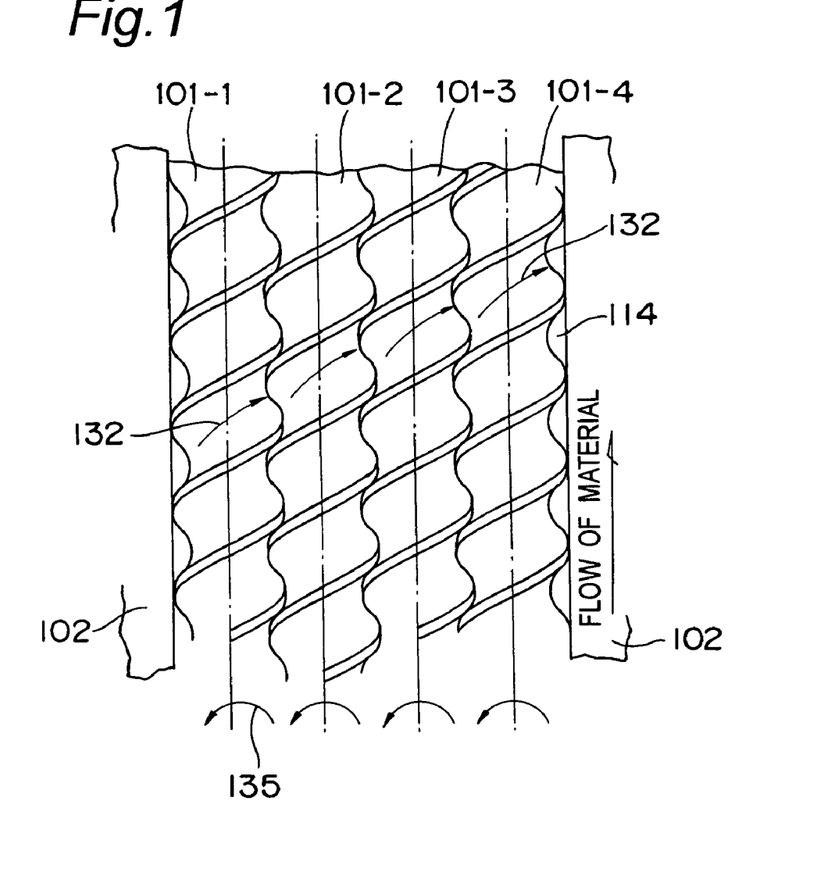
FIG. 1 is a plan view of screw shafts installed in an extruder of an embodiment of the present invention.
Figure 2:
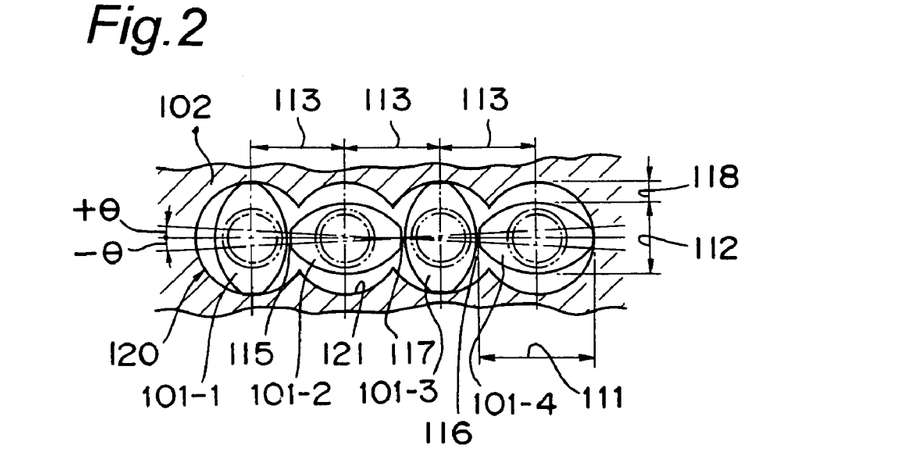
FIG. 2 is a sectional view of the screw shafts shown in FIG. 1.

According to the embodiment and as indicated in FIGS. 1 and 2, the screw shafts 101 comprises four screw shafts 101-1 to 101-4, each having a waveform shape with the same outer diameter 111, the same root diameter 112, and the same ratio of the (outer) diameter 111 to the root diameter 112. The screw shafts 101-1 to 101-4 are engaged with each other and are arranged in parallel to each other horizontally or nearly horizontally ("horizontal or nearly horizontal" meaning substantially horizontal) while an equal distance 113 between mutual axial centers (i.e., between longitudinal center axes). The aforementioned "nearly horizontally" means a positional deviation of each of the screw shafts 101-1 to 101-4 within ±θ degrees with respect to a horizontal axis centering a central part in a horizontal direction of the four screw shafts 101-1 to 101-4. Specifically, the above θ is 5 degrees, preferably 3 degrees. Therefore, "substantially horizontal" means that the screw shafts are arranged to have a positional deviation no greater than ±5 degrees with respect to the horizontal axis, as explained above.

Although four screw shafts 101 are arranged in the present embodiment as described hereinabove, the present invention is not limited to this, and three or more screw shafts can be installed.

Since it is preferable that no change is generated in the screw (outer) diameter between the experimental machine and the actual machine as discussed earlier, and also from a viewpoint of making a depth 118 of a screw groove 114 shallow as will be described later, the (outer) diameter 111 of each of the screw shafts 101 is preferably not larger than 50 mm. From this viewpoint, each screw shaft 101 having an outer diameter 111 of, e.g., approximately 12–15 mm can be used. In an exceptional case, three or more screw shafts 101 having an outer diameter 111 of, for instance, approximately 150 mm are arranged.

The barrel 102 has an inner face 121 which forms a screw fitting part 120. The screw fitting part 120 has a shape so that all of the screw shafts 101-1 to 101-4 can be fitted rotatably therein under the above-described arrangement condition, specifically, a shape with a plurality of gourds coupled along the horizontal direction.

Figure 8:
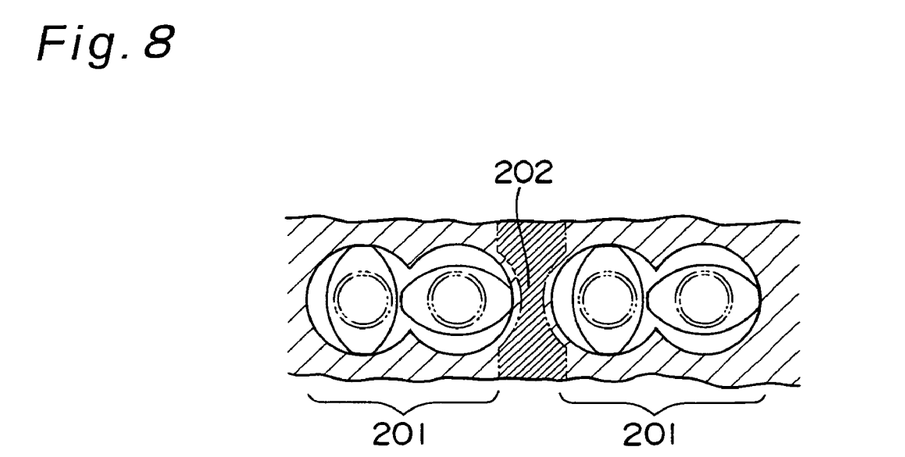
FIG. 8 is a diagram for explaining an arrangement example of four screw shafts.
Figure 9:
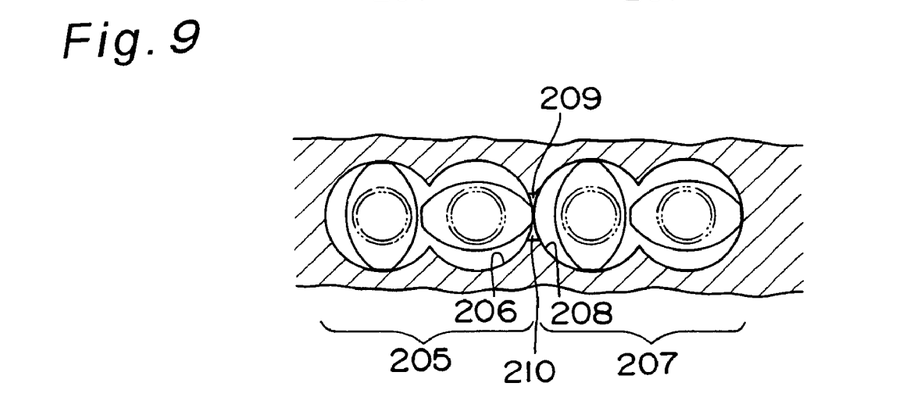
FIG. 9 is a diagram for explaining an arrangement example of the four screw shafts.
Figure 10:
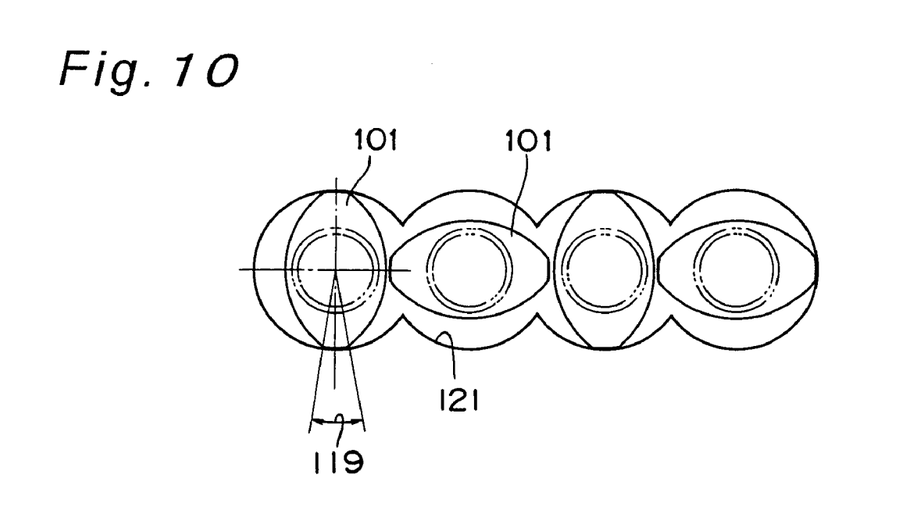
FIG. 10 is a diagram for explaining a flight angle at the screw shafts.

In the case of designing a barrel for storing four screw shafts on the basis of a conventionally existing barrel for storing two screw shafts, two methods can be considered, namely, a method of arranging two sets each having two screw shafts 201, with a clearance 202 formed between the sets as shown in FIG. 8, and a method of arranging one screw set 205 and the other screw set 207 so that a barrel inner face 206 for storing the one screw set 205 and a barrel inner face 208 for storing the other screw set 207 contact each other in a tangent direction as shown in FIG. 9. In the case shown in FIG. 8, however, the clearance 202 marked by oblique lines and its adjoining region should be heated and cooled more than the other parts in the barrel because of the need for heating or cooling the material 131 at each of the screw sets 205 and 207, thereby causing the barrel to be large. On the other hand, in the case shown in FIG. 9, edge portions 209 and 210 of the barrel present at contact parts between the inner face 206 and the inner face 208 should be removed to prevent the edge portions 209 and 210 from being broken. As a result, the removed portions become dead spots to collect the material, leading to a problem of thermal degradation of the material, or the like.

As such, according to the present embodiment as shown in FIG. 2, the screw shafts 101-1 to 101-4 are arranged so that a clearance 115 between a root of the screw shaft 101-1 and a crest (outer periphery) of the screw shaft 101-2, a clearance 116 between a root of the screw shaft 101-3 and a crest of the screw shaft 101-4, and a clearance 117 between a crest of the screw shaft 101-2 and a root of the screw shaft 101-3 become equal to each other.

The screw fitting part 120 as described above kneads the material 131 present in the thread groove 114 of each of the screw shafts 101-1 to 101-4 through the rotation of the screw shafts 101 by the drive unit 103 in a direction of an arrow 135 as indicated in FIGS. 4–7. In other words, the material 131 present in each thread groove 114 is rotated and kneaded within the thread groove 114 as designated by an arrow 134 through the rotation of the screw shafts 101. The material 131 while being kneaded is moved to the thread groove 114 of the adjoining screws 101 in a direction of an arrow 132 indicated in FIG. 1. In the whole of the screw fitting part 120 in the barrel 102, the material 131 is moved while being kneaded in a sequence from the screw shaft 101-1 to the screw shaft 101-2 to the screw shaft 101-3 to the screw shaft 101-4 to the screw shaft 101-3 to the screw shaft 101-2 to the screw shaft 101-1 along the shape of the inner face 121 as indicated by an arrow 133 in FIG. 7.

By including the barrel 102 having the screw arrangement and the inner face 121 as shown in FIG. 2, a filling situation and a kneading state of the material 131 can be made equal at each of the screw shafts 101-1 to 101-4.

Assuming that an extrusion amount of the material 131 is kept the same as in the conventional case having a large diameter and two screw shafts, if a section in a diametrical direction of the screw shaft is made geometrically similar to that of the twin-screw and the number of screw shaft is made three or more, the diameter of the screw shaft can be made small as compared with the conventional art and the depth 118 of the thread groove 114 of the screw shaft can be made shallow. Accordingly, a surface length and a barrel inner face length of the screw shafts 101 become long as compared with the conventional art. The number of position change times of the material 131 is increased because of the above increase of the surface length and the inner face length in comparison with the conventional art, so that a kneadability of the material 131 can be improved in comparison with the case of the conventional twin-screw extruder having the large diameter of screw shafts.

Further, since the depth 118 of the thread groove 114 is rendered shallow due to the reduction of the screw diameter 111, temperature irregularities at the material 131 present in one thread groove 114 are reduced. Particularly when the material has a large self-heating value, the self-heating value can be decreased because the screw outer diameter 111 can be reduced. According to the extruder 100 of the embodiment, the extrusion amount of the material 131 can be controlled by the number of screw shafts 101 in a state while a change of physical properties of the material 131 is lessened more.

The above reduction of the screw outer diameter saves energy and can reduce mechanical loss, which is suitable for small production in a variety of kinds and improves the operability.

Since also the barrel 102 is made compact by the reduction of the screw outer diameter 111, heat conduction of heating and cooling to the barrel 102 can be improved.

In addition, since the thread grooves 114 of the screw shafts 101 communicate with the material supply part 104 and the vent part 108, and the depth 118 of the thread groove 114 is shallow as described above, air vent from the material 131 is facilitated.

The reduction of the screw outer diameter 111 increases the flight angle 119 of each screw 101. More specifically, the flight angle can be approximately 20 degrees or larger. Therefore, in comparison with a case where the screw diameter is increased, the abrasion resistance between screws 101 can be improved while the same treatment volume is secured. At the same time, a leak amount of the material 131 from the screws 101 can be reduced. A lead of each of the screws 101 is shortened by the reduction of the screw diameter 111 and the increase of the flight angle 119, and consequently the extrusion amount of the material 131 is reduced. However, the reduced amount can be compensated by increasing the number of screws 101.

According to the extruder 100 of the present embodiment as described above, the outer diameter 111 of each screw shaft 101 can be reduced by controlling the extrusion amount of the material 131 by the number of the screw shafts 101, and this reduction can solve various conventional kinds of trouble such as the change of the screw peripheral velocity, temperature irregularities of the material 131 in the screw groove 114, leakage of the material 131 from the screw shafts 101, an installation area of the extruder 100, and the like. Moreover, since the number of screw shafts 101 can be increased in conformity with a target extrusion amount, the screw groove 114 can be made shallow due to the increase in the number of screw shafts as above, and the temperature irregularities of the material 131 can be improved, thus enabling molding of the material improved in heating/cooling efficiency. The larger the screw shaft number (quantity) is made, the more portions the screw shafts are engaged with each other. Therefore, the heating/cooling efficiency can be enhanced as described above while the self-cleanability of the screw shafts 101 is maintained.

In the above embodiment, the shape of each of the screw shafts 101 is exemplified by a two-thread screw. The same effect as described above can be obtained by a single-thread screw or three-thread screw. The shape of each of the screw shafts 101 is changeable from viewpoints of the abrasion of the screw shaft and the leakage of the material 131 from an outer circumferential part of each of the screw shafts 101.

The foregoing description is based on the assumption that the material 131 never leaks from a gap between the screw shafts 101 and the barrel 102 except the case related to leakage of the material 131 because of the change of the flight angle 119.

Figure 11:
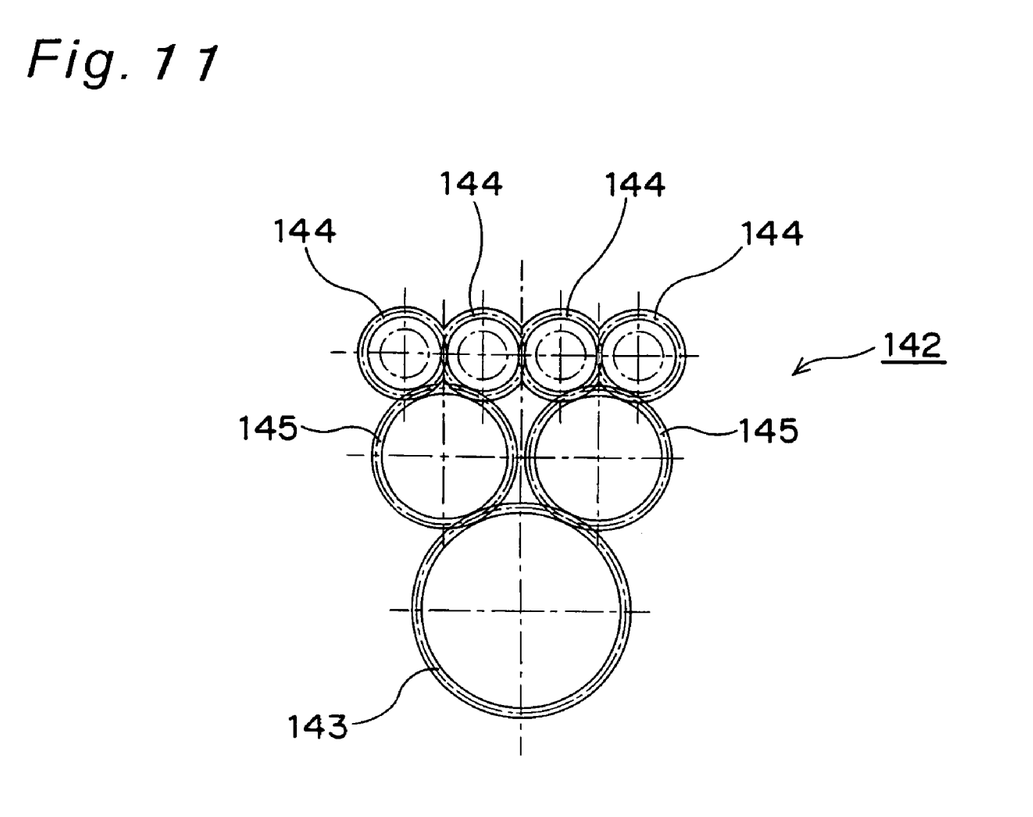
FIG. 11 is a diagram showing a structure of a reduction gear installed in a drive unit shown in FIG. 3.

The drive unit 103 will now be described. The drive unit 103 is equipped with, as shown in FIG. 3, a motor 141 as a driving source for rotating the screw shafts 101, and a reduction gear 142 with the motor 141 connected thereto which decelerates and transmits the rotation of the motor 141 to the screw shafts 101. As shown in FIG. 11, the reduction gear 142 has one input gear 143 connected to the motor 141, four screw drive gears 144 connected to the screw shafts 101-1 to 101-4 respectively, and two idle gears 145 which couple the above input gear 143 and the screw drive gears 144 with each other. A stage number and a reduction gear ratio of gears for driving the screw shaft 101 are equal for each of the screw shafts 101-1 to 101-4 in the reduction gear 142. The stage number and the reduction gear ratio of gears for driving each screw shaft are adjusted so as to become equal to each other by the idle gears even when the number of screw shafts exceeds four.

The stage number of gears for driving each of the screw shafts 101-1 to 101-4 becomes two by using the reduction gear 142 of the above configuration, so that a difference of cumulated backlash of gears can be reduced. A clearance between flights of the screw shafts 101 can be narrowed, and accordingly the leak of the material 131 from the screw shafts 101 can be reduced.

A comparison between an example of the extruder 100 of the present embodiment with the above-described configuration, and the conventional extruder will be discussed below.

In the conventional twin-screw extruder, the treatment volume of 50 kg/hour of the material 131 which includes PP (polypropylene), rubber and talc is obtained at a molding temperature of 210 degrees and by rotating the screw shafts at 400 rpm while the screw outer diameter is 40 mm and the L/D is 30. In a case where the same treatment volume is to be handled by the extruder 100 of the present embodiment, the extruder comes to be equipped with four screw shafts 101 of the diameter of 30 mm, and the L/D is made 30. Since the screw shafts 101 are made geometrically equal to the conventional one of the screw outer diameter of 40 mm, a total length of the screw shaft 101 is shortened from 1200 mm to 900 mm. In other words, a total length of the extruder 100 can be reduced by 33%, a screw weight can be reduced by approximately 18%, an installation area can be reduced, and heat energy by the heater or the like can be reduced because of a reduction of a heating/cooling zone.

A working device for working objects molded by the die 105 can be connected to a discharge side of the die 105. When the material 131 is molded by the die 105 into, e.g., a cylindrical shape, an example of the working device includes a water bath for cooling the object molded by the die 105, and a cutting device 160 shown in FIG. 18 for cutting the molded object which passes the water bath to a constant length. The product cut by the cutting device 160 becomes, for example, a pellet shape of a diameter of approximately 3 mm and a length of approximately 3 mm.

Figure 18:
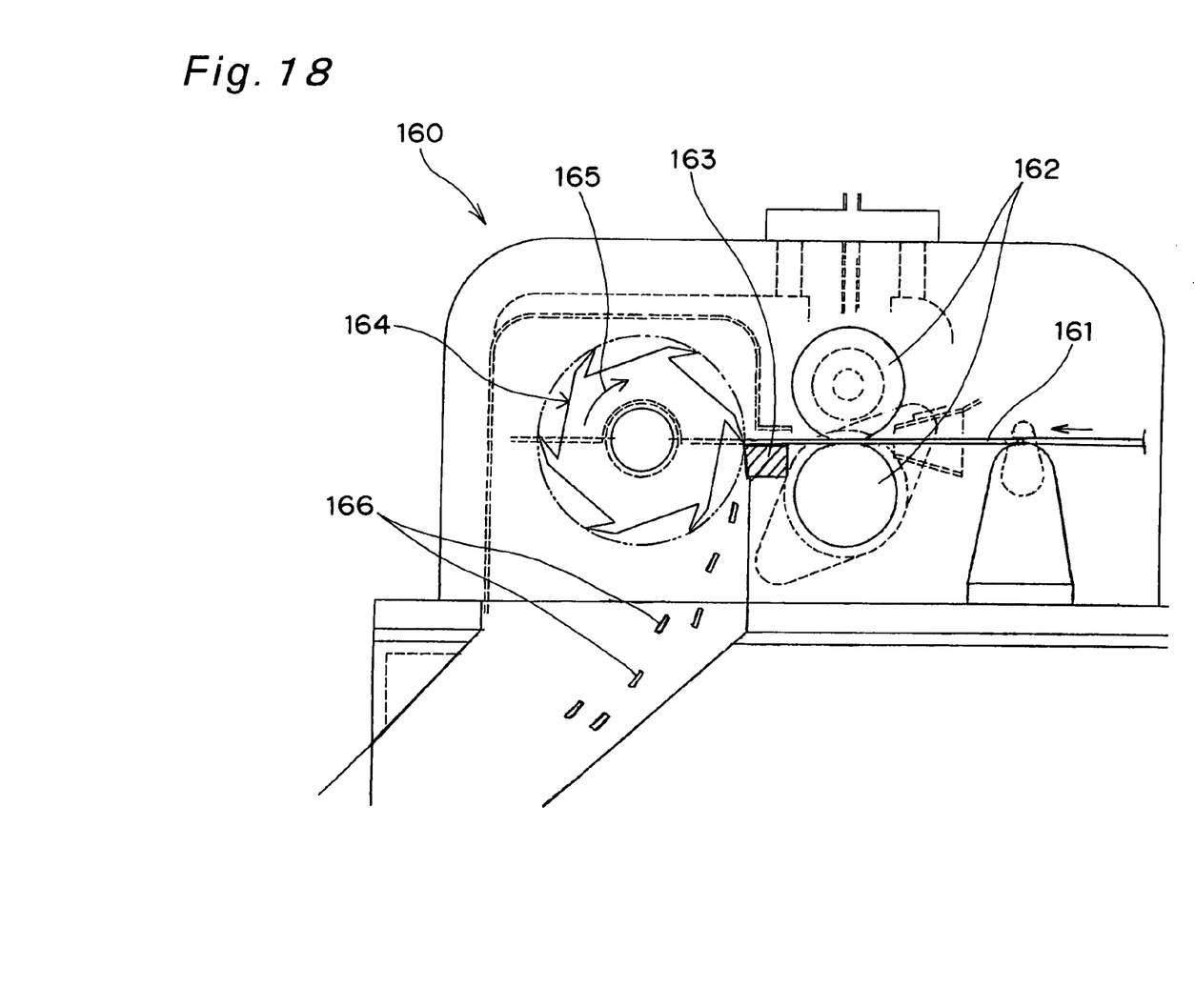
FIG. 18 is a diagram showing a structure of a cutting device connectible to the extruder shown in FIG. 3.

The cutting device 160 has rollers 162 for further shaping the shape of the molded object 161 cooled in the water bath, a fixed blade 163 and a rotary blade 164. The molded object 161 supplied continuously from the rollers 162 onto the fixed blade 163 is cut by the rotary blade 164 which is rotating in a direction of an arrow 165, to be the product 166.

In the above description, the extruder 100 of the embodiment is described to be able to obtain the same treatment volume as that of the conventional twin-screw extruder with the large diameter. When the treatment volume is compared between the extruder 100 of the present embodiment having four screws 101 of the same diameter as the screw diameter of the conventional twin-screw extruder, and the conventional twin-screw extruder, although the treatment volume is apparently considered to be double since the number of screws is twice as many, the extruder 100 of the present embodiment can actually achieve approximately 2.5 to 3 times a throughput of the conventional extruder. The reason for this is considered as follows. As shown in FIGS. 4–7, the material 131 moves in each groove 114 in the direction denoted by the arrow 133. At this time, surfaces of adjacent screw shafts 101 shift in opposite directions as indicated by arrows at portions where grooves 114 formed by adjacent screw shafts 101 intersect, for instance, at V-shaped portions marked by a reference numeral 137 in FIG. 5. In consequence, a moving direction of the material 131 is switched in the V-shape as is made clear by the arrows, and a shear rate is further increased. A meltability and a kneadability of the material 131 are improved by effects produced by the switching of the moving direction. That is, the meltability and the kneadability can be improved by increasing the number of the V-shaped portions 137. There are six V-shaped portions 137 present in the extruder 100 of the embodiment, whereas there are two V-shaped portions in the conventional twin-screw extruder.

Additionally, as shown in FIG. 2, in each screw shaft 101, two clearances between the crests of the screw shafts 101 and the inner face 121 of the barrel 102, and the clearance 115 between the adjacent screw shafts 101, i.e., a total of three clearances are designed considerably narrow in comparison with the conventional machine. Hence the screw shafts 101 are engaged tightly with each other, and an effect of scraping the material 131 (a so-called wiping effect) at surfaces of the engaged counterpart screws 101 is enhanced greatly. Thus since leakage of the material 131 from each part is reduced, the throughput is increased.

Because of the above-described switching effect and the wiping effect, it can be said that the extruder 100 of the present embodiment can achieve approximately 2.5 to 3 times the throughput of the conventional extruder.

Any suitable combination of the above various embodiments can exert respective effects.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An extruder comprising:
   at least three screw shafts having the same outer diameter and the same root diameter and each having a waveform-shaped screw thread, said at least three screw shafts being engaged with each other and being arranged in parallel and substantially horizontally and so that a distance between longitudinal center axes of adjacent screw shafts is equal;
   a drive unit operable to rotate all of said screw shafts at the same velocity and in the same direction; and a barrel having a screw fitting part, all of said screw shafts being rotatably inserted in said screw fitting part, said screw fitting part being configured to knead and move an extrusion material in a thread groove of a first one of said screw shafts to a thread groove of an adjacent second one of said screw shafts via rotation of said screw shafts by said drive unit, all of said screw shafts being arranged in said screw fitting part so that a clearance between a thread groove of each of said screw shafts and a crest of an adjacent engaged screw shaft is constant, said thread grooves of all of said screw shafts being shaped and arranged to move the extrusion material along an inner surface of said barrel via the rotation of said screw shafts.

2. The extruder of claim 1, wherein all of said screw shafts are tightly arranged in said screw fitting part so that a clearance between a crest of each of said screw shafts and said inner surface of said barrel is made narrow so as to reduce leakage of the extrusion material along an entire length of said adjoining screw shafts.

3. The extruder of claim 1, wherein said outer diameter of each of said screw shafts is no greater than 50 mm.

4. The extruder of claim 3, further comprising a molding section attached to said barrel and configured to mold the extrusion material extruded by said screw shafts.

5. The extruder of claim 1, further comprising a molding section attached to said barrel and configured to mold the extrusion material extruded by said screw shafts.

6. The extruder of claim 1, wherein said screw fitting part has switching portions configured to switch a moving direction of the extrusion material so as to improve kneadability of the extrusion material when the extrusion material in said thread groove of each of said screw shafts is moved to a thread groove of an adjacent one of said screw shafts, said switching portions in said screw fitting part being shaped and arranged, along with said thread grooves of all of said screw shafts, to move the extrusion material along an inner surface of said barrel via the rotation of said screw shafts.

7. The extruder of claim 1, wherein each of said screw shafts comprises a two-thread screw shaft, said screw shafts being shaped and arranged so that a crest of a first one of said screw shafts and a crest of an adjacent second one of said screw shafts is shifted 90 degrees.

8. The extruder of claim 1, wherein said inner surface of said barrel has V-shaped portions extending into said screw fitting part between adjacent screw shafts for kneading the extrusion material.

* * * * *